US007339000B1

(12) United States Patent
McClain et al.

(10) Patent No.: US 7,339,000 B1
(45) Date of Patent: *Mar. 4, 2008

(54) METHOD AND APPARATUS FOR PRODUCING AN AQUEOUS PAINT COMPOSITION FROM A PLURALITY OF PREMIXED COMPOSITIONS

(75) Inventors: C. Daniel McClain, Tempe, AZ (US); Randall L. Hughes, Glendale, AZ (US)

(73) Assignee: Coatings Management Systems Inc., Gilbert, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,001

(22) Filed: May 24, 2000

Related U.S. Application Data

(63) Continuation-in-part of application No. 09/221,332, filed on Dec. 23, 1998, now Pat. No. 6,221,145.

(51) Int. Cl.
*C08K 3/18* (2006.01)
*C08K 3/22* (2006.01)
*C08K 5/09* (2006.01)
*C08K 5/10* (2006.01)

(52) U.S. Cl. ............... 524/495; 524/264; 524/297; 524/417; 524/430; 524/432; 524/445; 524/493; 524/497; 106/236; 106/433; 106/436; 106/441; 106/445; 106/447

(58) Field of Classification Search ............... 106/433, 106/436, 447, 241, 443, 445, 236; 524/430, 524/432, 297, 284, 417, 445, 493, 497, 495
See application file for complete search history.

(56) References Cited

U.S. PATENT DOCUMENTS

| 3,758,432 | A | * | 9/1973 | Hopper .................. 524/198 |
| 3,956,206 | A | | 5/1976 | Sellars et al. |
| 4,046,287 | A | * | 9/1977 | Hoekstra et al. ............ 141/329 |
| 4,243,430 | A | | 1/1981 | Sperry et al. |
| 4,373,930 | A | | 2/1983 | Rothwell |
| 4,403,866 | A | | 9/1983 | Falcoff et al. |
| 4,436,845 | A | | 3/1984 | Kitano |
| 4,705,083 | A | | 11/1987 | Rossetti |
| 4,880,842 | A | | 11/1989 | Kowalski et al. |
| 4,967,938 | A | | 11/1990 | Hellenberg |
| 5,078,302 | A | | 1/1992 | Hellenberg |
| 5,129,551 | A | | 7/1992 | Gott |
| 5,268,849 | A | | 12/1993 | Howlett et al. |
| 5,445,195 | A | * | 8/1995 | Kim ........................ 141/100 |
| 5,521,234 | A | | 5/1996 | Brown et al. |
| 5,527,853 | A | | 6/1996 | Landy et al. |
| 5,643,669 | A | * | 7/1997 | Tsuei ...................... 428/354 |
| 5,672,649 | A | * | 9/1997 | Brock et al. ............... 524/507 |
| 5,773,752 | A | | 6/1998 | Blume et al. |
| 5,823,670 | A | | 10/1998 | Rushing et al. |
| 5,842,641 | A | | 12/1998 | Mazzalveri |
| 5,877,234 | A | | 3/1999 | Xu et al. |
| 5,922,398 | A | | 7/1999 | Hermes et al. |
| 5,989,331 | A | | 11/1999 | Bauer et al. |
| 6,013,721 | A | | 1/2000 | Schall et al. |
| 6,074,474 | A | * | 6/2000 | Broome et al. ............. 106/486 |
| 6,221,145 | B1 | * | 4/2001 | McClain .................... 106/436 |
| 6,308,499 | B1 | | 10/2001 | Takada et al. |

FOREIGN PATENT DOCUMENTS

| CA | 935 255 | 10/1973 |
| CA | 2166290 | 11/1995 |
| DE | 39 10 472 | 10/1990 |
| DE | 197 14 577 | 10/1998 |
| EP | 0 614 951 | 9/1994 |
| EP | 0 706 543 B1 | 4/1996 |
| EP | 1 094 096 | 4/2001 |
| IE | 940666 | 8/1994 |
| IT | PS98A000005 | 2/1998 |
| IT | PS98A000005 | 8/1999 |
| JP | 59-172559 | 9/1984 |
| WO | WO 94/25238 | 11/1994 |
| WO | WO 95/29960 | 11/1995 |
| WO | WO 98/05417 | 2/1998 |

(Continued)

OTHER PUBLICATIONS

Patton, "Latex Critical Pigment Volume Concentration (LCPVC)", *Paint Flow and Pigment Dispersion*, 1979, p. 193, Dec. 1979.
Forsius, "Paint Production by Component Mixing", *Faerg Lack Scand.*, 1997, 43(2), 5-6, Dec. 1997.
Dutheillet, "Integrated Solution to Build Batch Processing Plants for Blending & Formulation Industries", *Chemical Engineering World*, 1997 32(5), 37-44, Dec. 1997.
Orcun, et al., "Scheduling of Batch Processes: An Industrial Application in Paint Industry", *Computers Chem. Enng.*, 1997, 21 S673-S678, Dec. 1997.

(Continued)

*Primary Examiner*—Kriellion A Sanders
(74) *Attorney, Agent, or Firm*—Schmeiser, Olsen & Watts LLP

(57) ABSTRACT

The present invention is directed to the provision of premixed aqueous compositions which are used to provide a paint composition of varying finish characteristics at the point of sale. Thus, the merchant distributing the paint composition made from the subject premixed compositions need only maintain inventory of four compositions. The particular compositions which are the subject of the invention exhibit stable characteristics during storage in their respective reservoirs. The compositions include a pigment composition, a dispersant thickening agent, a high resin content binder, and a low resin content binder. The compositions are combined in differing amounts to produce paint compositions being suitable for either interior or exterior use and having differing sheens, quality levels, and color bases.

61 Claims, 5 Drawing Sheets

FOREIGN PATENT DOCUMENTS

WO     WO 00/37568     6/2000
WO     WO 00/44834     8/2000

OTHER PUBLICATIONS

"Component Mixing—A New Approach to Customized Paint Production", *High Technology Finland*, 2000, 156-157, Dec. 2000.

Helander, "Benefits of delayed product differentiation", *Reprinted from PPCJ*, 1999, Dec. 1999.

Helander, "Impact of Form Postponement on Channel Members' Performance in Paint Business: A Theoretical Approach", *LTA*, 1999, p. 225-237, Dec. 1999.

\* cited by examiner

METHOD AND APPARATUS FOR PRODUCING AN AQUEOUS PAINT COMPOSITION FROM A PLURALITY OF PREMIXED COMPOSITIONS

This application is a continuation-in-part of the earlier patent application to C. Daniel McClain entitled "METHOD OF PRODUCING AN AQUEOUS PAINT COMPOSITION FROM A PLURALITY OF PREMIXED COMPONENTS", Ser. No. 09/221,332, filed Dec. 23, 1998, and issued as U.S. Pat. No. 6,221,145 on Apr. 24, 2001.

BACKGROUND OF THE INVENTION

1. Technical Field

This invention relates to the production of an aqueous paint from a plurality of premixed compositions.

2. Background Art

The traditional manufacture of paint has utilized processes which continuously fill containers with a neutral or base color at the central facility. The containers are transported to the point of use or point of sale and stored until use or resale. The transport and storage in the individual containers adds significantly to the cost of the sold product for it is necessary to inventory a wide variety of paints having different finish characteristics to satisfy consumer demand. For example, the finishes offered for sale range from the traditional flat paint through varying resin compositions up to a high gloss finish. Inventory is maintained for all the different finishes at the point of sale by the merchant.

The manufacture of paint at the central facility can be either a batch process or an extended continuous mixing process. The process typically calls for mixing a pigment containing ground titanium dioxide along with a thickener, a viscosity controlling agent and resin added to the water base. The pigment is a composition with a high percentage solids suspended in water. Storage for any significant period of time of a premixed pigment composition typically results in settling and a non-uniform distribution of constituents throughout the premix. Consequently, manufacturing processes are designed to limit the residence time in premixing containers in order to promote the manufacture of more uniform products.

DISCLOSURE OF INVENTION

The present invention is directed to the provision of prepaints, which are fluid prepaint compositions or premixed aqueous compositions which can be used to provide a paint mixture of varying finish characteristics at the point of sale. Thus, the merchant distributing the paint composition made from the subject premixed compositions need only maintain inventory of four compositions. The particular compositions which are the subject of the invention exhibit stable characteristics during storage in their respective reservoirs.

According to the present invention, an apparatus includes a first supply reservoir containing a first premixed composition. The first composition may be any one of four compositions, the four compositions including a pigment composition, a dispersant thickening agent, a high resin content binder, and a low resin content binder. The apparatus also includes a second supply reservoir containing a second premixed composition that is another of the four compositions. A first valve is fluidly connected to the first supply reservoir and a second valve fluidly connected to the second supply reservoir. An actuator system is connected to the first valve and the second valve. A receiving reservoir is fluidly connected to the first valve and the second valve, and a measuring system measures a first flow amount of the first premixed composition supplied from the first supply reservoir to the receiving reservoir and measures a second flow amount of the second premixed composition supplied from the second supply reservoir to the receiving reservoir. A control system is connected to the measuring system. The measuring system emits a first amount signal that represents the first flow amount and a second amount signal that represents the second flow amount, and the control system receives the first amount signal and the second amount signal. The control system emits a first close signal to the actuator system when the first amount signal indicates that the first flow amount equals a first predetermined amount, thereby prompting the actuator system to close the first valve. The control system emits a second close signal to the actuator system when the second amount signal indicates that the second flow amount equals a second predetermined amount, thereby prompting the actuator system to close the second valve.

A method of producing an aqueous paint composition or fluid prepaint is also provided. The method includes storing a first premixed composition in a first supply reservoir. The first composition may be any one of four compositions, the four compositions including a pigment composition, a dispersant thickening agent, a high resin content binder, and a low resin content binder. The apparatus also includes a second supply reservoir containing a second premixed composition that is another of the four compositions. The method also includes storing a second premixed composition that is another of the four compositions in a second supply reservoir. The method determines a first predetermined amount of the first premixed composition and a second predetermined amount of the second premixed composition. The first premixed composition is supplied from the first supply reservoir to a receiving reservoir, and the second premixed composition is supplied from the second supply reservoir to the receiving reservoir. A first flow amount of the first premixed composition supplied from the first supply reservoir to the receiving reservoir and a second flow amount of the second premixed composition supplied from the second supply reservoir to the receiving reservoir are measured. Supply of the first premixed composition is ceased when the first flow amount equals the first predetermined amount and supply of the second premixed composition is ceased when the second flow amount equals the second predetermined amount.

The method of producing a desired paint composition may include prompting a user to input into an apparatus a selection of either interior or exterior paint, prompting the user to input into the apparatus a desired sheen, prompting a user to input into the apparatus a desired quality, prompting a user to input into the apparatus a desired color type, and automatically producing the desired paint composition. The step of automatically producing the desired paint composition is performed by the apparatus so that the paint composition has the desired sheen and the desired quality. The desired paint composition is also well-suited for the desired color type and for either interior or exterior use as desired.

The invention also includes a program product including a control program that prompts a user to input a selection of paint that is well-suited for interior use or paint that is well-suited for exterior use, a desired sheen, a desired quality, and a desired color type. The control program also controls an apparatus to produce the desired paint composition. The desired paint composition has the desired sheen and the desired quality. The desired paint composition is also well-suited for the desired color type and for either interior or exterior use as desired. The program product also includes signal bearing media bearing the control program.

Another method of producing an aqueous paint composition according to the present invention includes placing a first premixed aqueous composition in a receiving reservoir. The first composition may be any one of four compositions, the four compositions including a pigment composition, a dispersant thickening agent, a high resin content binder, and a low resin content binder. This method also includes placing a second premixed aqueous composition that is another of the four compositions in the receiving reservoir. The second aqueous composition is also selected from the group of premixed aqueous compositions, but the second aqueous composition is a different one of the group of premixed aqueous compositions than the first aqueous composition.

Another method of producing an aqueous paint composition includes mixing a first aqueous composition and a second aqueous composition. The first composition may be any one of four compositions, the four compositions including a pigment composition, a dispersant thickening agent, a high resin content binder, and a low resin content binder, but the second aqueous composition is a different one of the four compositions than the first aqueous composition. This method includes storing the first aqueous composition in a first supply reservoir and storing the second aqueous composition in a second supply reservoir. The method also includes supplying the first aqueous composition from the first supply reservoir to the receiving reservoir and supplying the second aqueous composition from the second supply reservoir to the receiving reservoir.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements.

Modes for Carrying Out the Invention

Figure 1:
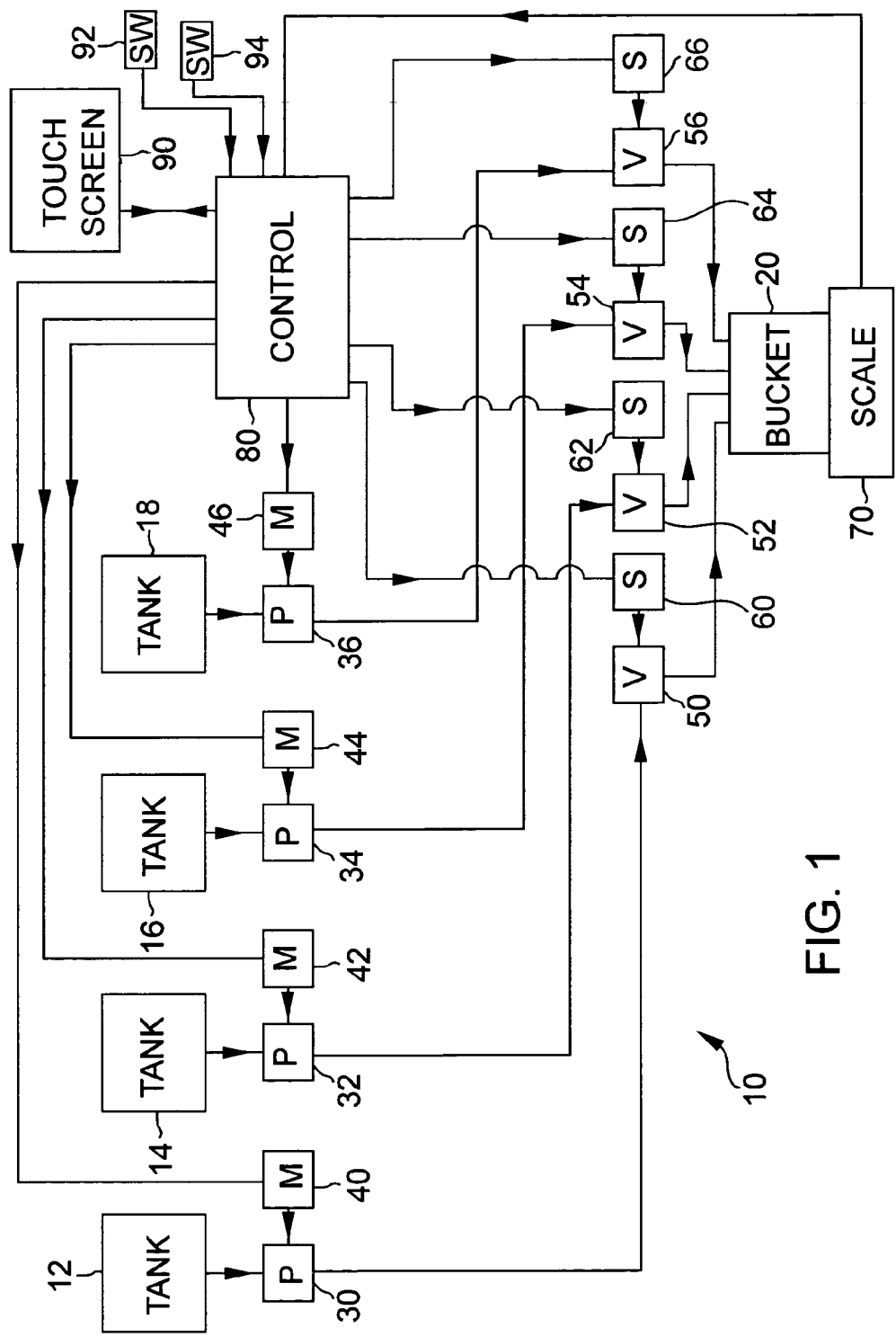
FIG. 1 is a schematic view of an apparatus according to an embodiment of the present invention.

Four premixed aqueous compositions according to an embodiment of the present invention are sufficiently stable to be utilized at the point of sale to the user to generate a water-based paint composition having the desired finish characteristics. The four premixed aqueous compositions are mixed to develop paints ranging from a flat finish to a high gloss finish. However, all four of the aqueous compositions are not used to produce every paint composition.

The pigment-containing constituent or premixed pigment composition preferably contains titanium dioxide finely ground in an amount residing within the range of 40 to 50 percent by weight or a corresponding range of pigment volume concentrations ("PVC") of the pigment. The ground titanium dioxide is a commercially available product used in a wide variety of paint compositions and its preparation techniques are well-known in the industry. The titanium dioxide is added to water which comprises about 25 percent of the resultant pigment composition. During the blending process, a mixture of calcined clay and silica in an amount of 15 percent by weight is added to maintain the titanium dioxide in suspension. A viscosity controlling agent is also added in an amount of about 10 percent of the resultant dispersion or pigment composition.

In order to maintain the titanium dioxide in a uniform dispersion, a dispersant-thickener is added during blending in an amount of less than 5 percent of the pigment composition. It has been found that the combination of a commercially-available dispersant supplemented by the addition of a phosphate-based dispersant such as potassium tri poly phosphate (KTPP) along with a modest amount of thickener enables the titanium dioxide pigment dispersion to remain uniform in distribution while stored.

The commercially available dispersant sold as BUSPERSE (a federally registered trademark owned by Buckman Laboratories, Inc.) and manufactured by Buckman Laboratories, Inc. is the primary dispersant and is added in amount of about 3.6 weight percent. In addition, the phosphate based dispersant KTPP is added in an amount of about 0.2 weight percent to the pigment composition. It is believed that the phosphate ions in this additive replace the carbonate and other ions in the water to enhance the wetting properties of the water and thereby promote the distribution of the titanium dioxide throughout. The thickener added is a cellulosic thickening agent. Several are commercially available for use in the manufacture of aqueous paint compositions. One example is the thickener sold under the trademark 481 by AKZO NOBEL (Sweden).

The novel combination of these additives to the combination of titanium dioxide and water in the stated proportions has been found to enable the aqueous pigment composition to be used at point of sale to generate the wide scope of paint products. In tests of the pigment dispersion stored in a 55 gallon reservoir without agitation for a period of 2½ months, no discernible settling was noted. The addition of resin in an amount of about 5 percent of the dispersion has been found to aid in reducing the time for the resultant paint to cure. This factor is useful but tends to reduce the storage time of the pigment dispersion and is utilized only when a reduced curing time is important to the user.

At the point of sale, three additional premixed aqueous compositions are available to custom prepare the desired paint. The second composition in terms of likely usage is a dispersant-thickening agent which serves as a dilutant. The second composition is predominantly water in an amount of about 93 percent by weight. There are three additional additives to the second composition. They include a phosphate-based dispersant such as the potassium tri poly phosphate used in the pigment composition in an amount of less than 1 percent. The phosphate-based dispersant is added along with approximately a like amount of a cellulosic thickener. The combination of dispersant and thickener acts in the same manner as in the pigment composition although it is to be noted that the amount of thickener is several times that used in the pigment composition. The additional additive is a coalescent in an amount of 4 to 5 weight percent.

One commercial coalescent found suitable for use is sold under the federally registered trademark TEXANOL by Eastman Kodak Company.

The dispersant-thickener agent is preferably used in formulating all paint compositions with the exception of a high gloss finish paint composition. The third and fourth compositions available for mixing are the resin-containing compositions. The low resin composition or prepaint is preferably about 50 percent resin by weight and about 28 percent water. However, the percentage of resin by weight can be as low as 10 percent. To this mixture of resin and water is added diatomaceous earth as a flattening agent in the amount of about 7 percent and a combination of ground limestone and calcined clay at about 11 percent and about 3.5 percent respectively. The combination of a dispersant and thickener are added in the aggregate amount of about 1.2 percent to promote the same long shelf life characteristic of the pigment composition.

The high resin component preferably contains resin in an amount of about 80 percent, water at about 15 percent and a commercially-available coalescent at about 2 percent. However, the percentage of resin by weight can be as high as about 90 percent. The amount of resin and water in the low and high resin compositions can be varied to achieve different finish characteristics. The resin utilized in the paint products formulated from the different combinations and found to provide the desired results is a 100 percent acrylic acrynol resin, such as the resin sold under the trademark 6183 by BASF. However, it is to be noted that other commercially available resins can be used if desired.

The four above-discussed formulations have been determined to be stable and free from settling when stored in reservoirs for extended periods. To produce a desired paint product, each storage reservoir is coupled through fluid pumps and appropriate valving to dispensing outlets with the discharge therefrom preferably being directed into the receiving reservoir which is preferably the point of sale container.

A flat finish product utilizes the dispersant thickening agent and low resin composition. To produce the paint products referred to as eggshell, satin and low sheen finishes a portion of high resin composition is added to the flat finish mixture. In the case of a desired semi-gloss finish paint, the high resin component is used as a replacement for the low resin component. A full gloss paint utilizes the high resin component, but not the dispersant thickening agent or the low resin composition.

The four compositions can also be varied to produce varying quality levels and to produce paint compositions that are suitable for either interior or exterior use and paint compositions having various color bases so that they are suitable for use as different types of colors.

An interior paint composition will have less resin than a comparable exterior paint. Accordingly, interior paint compositions will have less of the high resin and/or low resin compositions than a comparable exterior paint composition. Quality is increased by decreasing the amount of dispersant thickening agent in a paint composition and increasing the amounts of the pigment composition and the low and high resin compositions. The amount of pigment composition is varied to change the type of color for which the paint composition is well-suited. Generally white base requires more pigment composition than pastels, pastels require more pigment composition than tinting, tinting requires more pigment composition than deep tone, and deep tone requires more pigment composition than neutral base. Typically neutral base paint compositions will not have any pigment composition.

The actual balances between the components for the different finishes can be varied in accordance with the needs of the purchaser for a particular type of finish. For example, a particular purchaser may require a paint composition that will have greater coverage. Also, color additives are added to vary the color of the paint after the four premixed aqueous compositions are added to form the basic paint composition.

Typical paint compositions suitable for programmed dispensing at the point of sale include the four aqueous compositions in the weight percentages shown below:

| Finish | Pigment Comp. | Disp-Thickening | Low Resin | High Resin |
| --- | --- | --- | --- | --- |
| Flat | 32.5 | 24.9 | 42.6 | 0 |
| Satin | 38.8 | 17.9 | 10.2 | 33.1 |
| Semi-Gloss | 39.1 | 9.6 | 0 | 51.3 |
| High-Gloss | 44.0 | 0 | 0 | 56.0 |

All the foregoing examples are typical for retail quality paints suitable for exterior use with pastel colors. As can be appreciated from the disclosure provided herein, paint compositions may be provided by combining a set of two or more premixed compositions or prepaints.

An apparatus 10 for producing an aqueous paint composition according to the present invention will now be described with reference to FIGS. 1-5. Referring to FIG. 1, apparatus 10 includes four tanks that act as supply or storage reservoirs 12, 14, 16, 18 for the four premixed aqueous compositions described above. The premixed aqueous compositions can be stored in supply reservoirs 12, 14, 16, 18 for a significant period of time. Preferably, the reservoirs are able to store the aqueous compositions for at least one day, and more preferably for at least a week. In a preferred embodiment, the reservoirs can store the compositions for at least two and one half months. The desired amount of each of the four compositions is supplied to a bucket that acts as a receiving reservoir 20 for the desired aqueous paint composition. Preferably, receiving reservoir 20 is contained within the same container that will house the paint when it is sold to a consumer.

First Reservoir 12, second reservoir 14, third reservoir 16, and fourth reservoir 18 are preferably large tanks that will contain enough of the four compositions to last for a substantial period of time. In a preferred embodiment, first reservoir 12, second reservoir 14, third reservoir 16, and fourth reservoir 18 are each a 275 gallon polymer container. However, reservoirs 12, 14, 16, 18 may be any of several other containers that are suitable for holding aqueous compositions.

First reservoir 12, second reservoir 14, third reservoir 16, and fourth reservoir 18 are preferably fluidly connected to first pump 30, second pump 32, third pump 34, and fourth pump 36, respectively. First pump 30, second pump 32, third pump 34, and fourth pump 36 are preferably ¾ inch rotary gear pumps available under the model number 1V426 from W. W. Grainger, Inc. A first motor 40, second motor 42, third motor 44, and fourth motor 46 power first pump 30, second pump 32, third pump 34, and fourth pump 36, respectively. Motors 40, 42, 44, 46 are preferably 0.75 horsepower electric motors model number 4K858AA available from W. W. Grainger, Inc. Motors 40, 42, 44, 46 are preferably mechanically connected to pumps 30, 32, 34, 36, respectively by a drive belt and pulley assembly or other suitable mechanical drive connection. However, pumps 30, 32, 34, 36 may be other types of pumps and they may be powered in some other way. Also, other types of fluid transmitting systems, such as gravity feed systems may be used.

First pump 30, second pump 32, third pump 34, and fourth pump 36 are preferably fluidly connected to first valve 50, second valve 52, third valve 54, and fourth valve 56, respectively. First valve 50, second valve 52, third valve 54, and fourth valve 56 are actuated by an actuator system that preferably includes a first solenoid 60, second solenoid 62, third solenoid 64, and a fourth solenoid 66. Each solenoid 60, 62, 64, 66 preferably actuates a corresponding valve 50, 52, 54, 56. In a preferred embodiment, each solenoid-valve combination is the solenoid-valve combination available under the model number VE075 from Rain for Rent. However, those skilled in the art will appreciate that the valves 50, 52, 54, 56 may be a single four-way valve, and that solenoids 60, 62, 64, 66 may be a four-way actuator that is able to actuate valves 50, 52, 54, 56. Valves 50, 52, 54, 56 are fluidly connected to receiving reservoir 20. In a preferred embodiment, valves 50, 52, 54, 56 are positioned above receiving reservoir 20 so that fluids passing through valves 50, 52, 54, 56 drop directly into receiving reservoir 20 (see FIG. 2).

The fluid lines connecting the various components of apparatus 10 are preferably 0.75 inch inside diameter flexible polyvinyl chloride lines. However, they may be any of various lines that are sufficient to transfer fluids between reservoirs, pumps, and valves.

Receiving reservoir 20 is preferably a paint bucket that is suitable for containing paint when it is sold to a consumer. However, receiving reservoir 20 may be any type of container that will contain an aqueous paint composition.

Receiving reservoir 20 is seated on a scale or measuring system 70 that is connected to and emits a signal to a control 80 that represents the weight of reservoir 20. Scale 70 is preferably a model number CX 086 scale available from Aztech Controls Corp. in Mesa, Ariz. Flow meters or some other measuring system could be used to measure the flow amounts of each of the compositions into receiving reservoir 20.

Control 80 is preferably a programmable logic control system, such as the programmable logic control (PLC) system available from Quantum Automation in Tustin, Calif. that includes a housing unit having model number D2-06B, which houses units having model numbers D2-250, D2-08ND3, and F2-04AD-1, and two units having the model number D2-08TR. The electrical position and function of each of these units will be described in more detail below. Control 80 is connected to and emits control signals to motors 40, 42, 44, 46 to turn motors 40, 42, 44, 46 on and off. Control 80 is also connected to and emits control signals to solenoids 60, 62, 64, 66 to prompt solenoids 60, 62, 64, 66 to open and close valves 50, 52, 54, 56.

Control 80 is connected to and emits signals to a user interface that is preferably a touch screen 90 to prompt a user to input information. Additionally, touch screen 90 emits signals to control 80 that represent input from the user. Touch screen 90 is preferably a model number DP-C320 touch screen available from Quantum Automation. However, any of several touch screens would be sufficient as touch screen 90.

An emergency stop switch 92 is connected to control 80 so that when stop switch 92 is activated, stop switch 92 emits a signal to control 80 that will cause control 80 to turn motors 40, 42, 44, 46 off and to actuate solenoids 60, 62, 64, 66 to close valves 50, 52, 54, 56. Additionally, a receiving reservoir position indicator 94 is connected to control 80 so that when receiving reservoir 20 is not correctly positioned indicator 94 will send a signal to control 80 that, like the stop switch signal, will cause control 80 to turn motors 40, 42, 44, 46 off and to actuate solenoids 60, 62, 64, 66 to close valves 50, 52, 54, 56.

Figure 2:
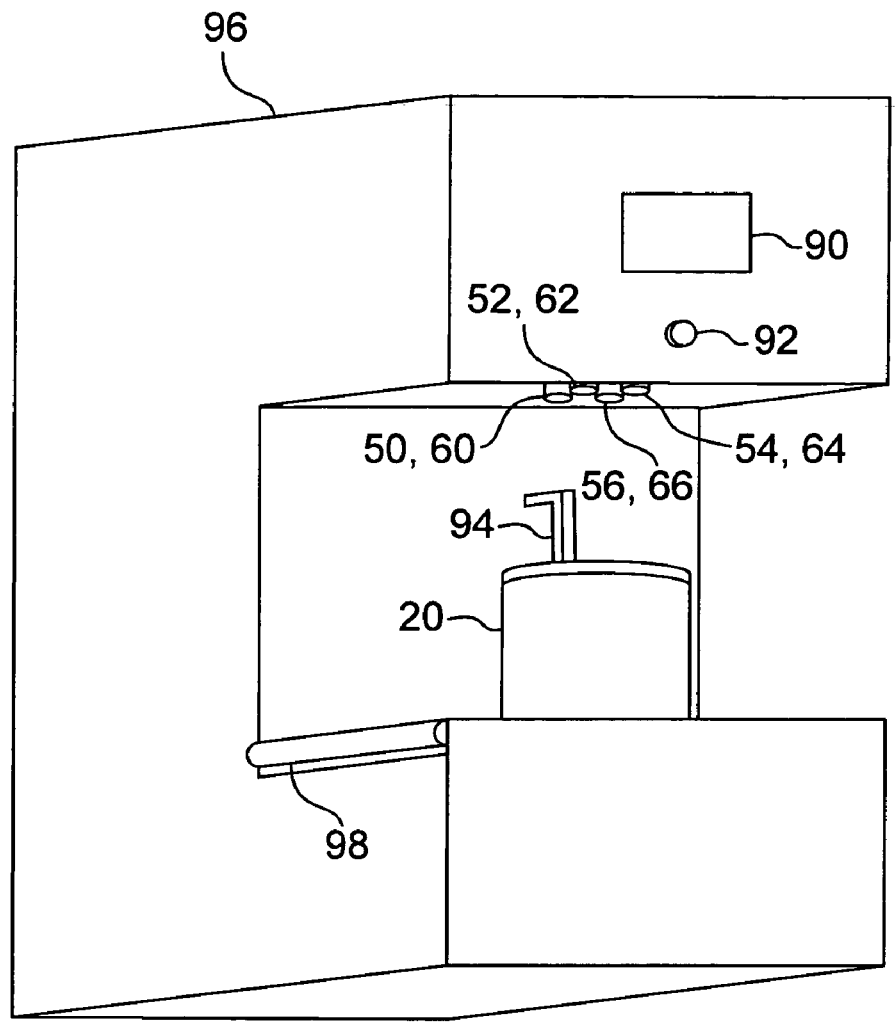
FIG. 2 is a perspective view of a portion of the apparatus of FIG. 1.

Referring to FIG. 2, emergency stop switch 92 is preferably activated and deactivated by a button located on the front of a frame 96 that houses valves 50, 52, 54, 56; solenoids 60, 62, 64, 66; scale 70 (not shown in FIG. 2); control 80 (not shown in FIG. 2); and touch screen 90. Preferably indicator 94 includes a lever that is depressed when receiving reservoir 20 is correctly positioned to receive aqueous compositions from valves 50, 52, 54, 56. Frame 96 preferably also houses a conveyor 98 that includes a series of rollers for easily moving buckets filled with aqueous solution away from valves 50, 52, 54, 56 and scale 70.

Figure 3:
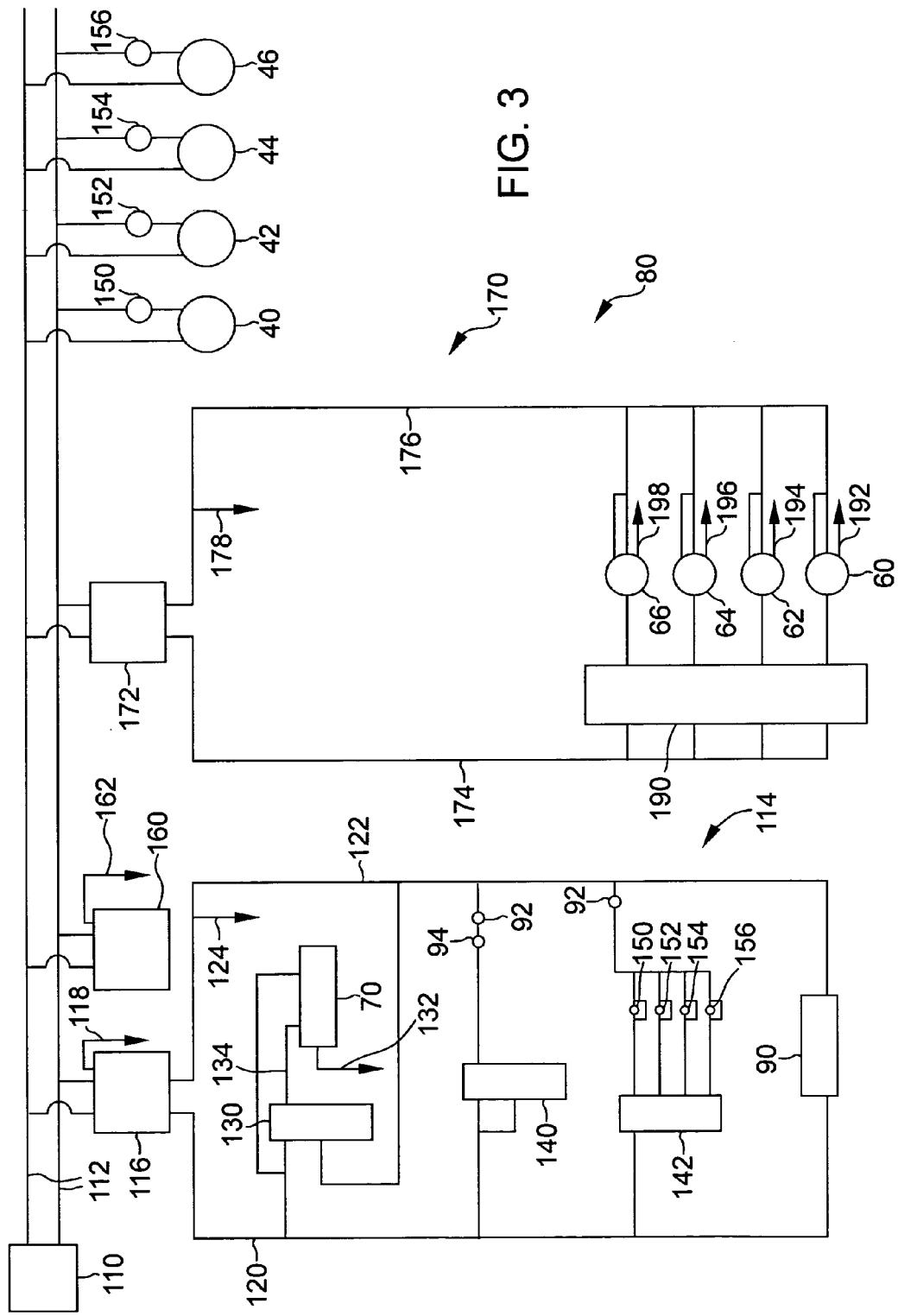
FIG. 3 is a schematic view of the circuitry of the apparatus of FIG. 1.

FIG. 3 depicts the circuitry for supplying electrical power to the various electrical components of apparatus 10. A power source 110 supplies 240 volt 60 Hertz AC electrical power to main power lines 112. A 24 volt DC circuit 114 includes a pair of lines extend from main power lines 112 to a 24 volt AC to DC converter 116. 24 volt converter 116 is grounded by a ground connection 118. A high voltage line 120 extends from 24 volt converter 116 that is at a positive 24 volts relative to ground. A low voltage line 122 extends from 24 volt converter 116 that is grounded by a ground connection 124.

A transducer unit 130 of control 80 is connected to high voltage line 120 and low voltage line 122. Transducer unit 130 is preferably a four channel analog input having the model number F2-04AD-1 unit discussed above. Scale 70 is connected to high voltage line 120 and is grounded by a ground connection 132 to provide electrical power for scale 70. Also, an output line 134 extends from scale 70 to transducer unit 130 to carry a signal representing the weight of an object carried on scale 70.

A switch unit 140 of control 80 is connected to high voltage line 120 and is connected to low voltage line 122 via emergency stop switch 92 and position indicator 94 so that if either emergency stop switch 92 or position indicator 94 are open then power will cease being supplied to switch unit 140 and to the remainder of the PLC units. Switch unit 140 is preferably the model number D2-08ND3 unit discussed above.

A motor control unit 142 is preferably connected to high voltage line 120. Motor control unit 142 includes four parallel connections to low voltage line 122, with each parallel connection extending via a motor switch. Thus, a first motor switch 150, a second motor switch 152, a third motor switch 154, and a fourth motor switch 156 are arranged in parallel so that motor switches 150, 152, 154, 156 are powered by 24 volt circuit 114. Emergency stop switch 92 is arranged in series with motor switches 150, 152, 154, 156 in addition to being connected to switch unit 140 above to provide an additional safeguard and assure that motors 40, 42, 44, 46 will be turned off if emergency stop switch 92 is activated. Motor control unit 142 is preferably one of the model number D2-08TR units discussed above.

Touch screen 90 is preferably connected to high voltage line 120 and low voltage line 122 to provide electrical power for touch screen 90.

A memory unit 160 is preferably connected directly to each of the main power lines 112 and it is grounded by ground connection 162. Memory unit 160 preferably includes the programmable memory that will embody control programming for control 80, including recipes for different paint compositions to be produced by apparatus 10. Memory unit 160 is preferably the model number D2-250 unit discussed above.

A 12 volt DC circuit 170 includes a 12 volt AC to DC converter 172 that is connected to main power lines 112. A high voltage line 174 that is at 12 volts relative to ground extends from 12 volt converter 172. A low voltage line 176 extending from 12 volt converter 172 is grounded by a ground connection 178. A solenoid control unit 190 includes four parallel connections to high voltage line 174. Solenoid control unit 190 also includes four parallel connections to low voltage line 176, with each parallel connection extending via a solenoid. Thus, first solenoid 60, second solenoid 62, third solenoid 64, and a fourth solenoid 66 are arranged in parallel. Each solenoid 60, 62, 64, 66 is grounded by a ground connection 192, 194, 196, 198, respectively. Each solenoid control unit is preferably one of the model number D2-08TR units discussed above.

First motor 40 is connected to main power lines 112 via first motor switch 150; second motor 42 is connected to main power lines 112 via second motor switch 152; third motor 44 is connected to main power lines 112 via third motor switch 154; and fourth motor 46 is connected to main power lines 112 via fourth motor switch 156. Thus, motor switches 150, 152, 154, 156 receive power for actuation from 24 volt circuit 114, but when they are open they prohibit the AC circuits to motors 40, 42, 44, 46 from being completed.

The operation and use of apparatus 10 will now be described with reference to FIGS. 1-4. It is to be understood that the various prompts made by touch screen 90 are activated by control 80, which sends signals to touch screen 90 and receives signals from touch screen 90. When apparatus 10 is not in operation, it is in a dormant state 210, wherein power is being supplied to various components, but none of them are functioning. In dormant state 210, touch screen 90 typically shows a logo or some other nonfunctional graphic. A user may activate apparatus 10 by touching touch screen 90, whereupon touch screen 90 shows a number/attribute prompt 212, which prompts a user to select either selection by recipe number 214 or selection by attribute 216. Preferably, at any point in the process described below, the user may select a main menu option to return to number/attribute prompt 212.

In the memory of memory unit 160, each valid recipe of the system, including the predetermined amounts of each of the four aqueous compositions, corresponds to a recipe number. If the user knows the recipe number for the desired recipe, then the user should select selection by recipe number 214. If the user selects selection by recipe number 214 by touching an appropriate area of touch screen 90, then a recipe number prompt 218 prompts the user to enter a recipe number. The user will then enter the number corresponding to the desired paint composition recipe by touching appropriate areas of touch screen 90. After the user has entered the number, the screen will show that the recipe number is either valid or invalid at 220. If the recipe is invalid, the user may enter another recipe number.

After entering a valid recipe number, the user may choose to verify stock availability 230 by touching an appropriate area of touch screen 90. If the user chooses to verify stock availability 230, touch screen 90 will prompt the user to enter a quantity 232. Touch screen 90 will then show whether the available amounts of the four aqueous compositions in reservoirs 12, 14, 16, 18 is sufficient or insufficient 234 to make the desired amount of the desired recipe.

Control 80 tracks the available amounts of each type of aqueous composition by subtracting the amounts of the aqueous compositions as they are supplied from reservoirs 12, 14, 16, 18. If reservoirs 12, 14, 16, 18 are physically refilled, then the amount in supply reservoirs 12, 14, 16, 18 can be reset as described below with reference to FIG. 5. After the amounts are reset, control 80 will again subtract amounts of the compositions as they are used. To determine whether availability is sufficient for a particular quantity 232 of a particular recipe, control 80 is programmed to subtract the necessary amount of each composition needed for the recipe from the current amount in the corresponding reservoir 12, 14, 16, 18. If the amount of any of the reservoirs 12, 14, 16,18 is less than zero after the subtraction, then the availability is insufficient. If the amount in all reservoirs 12, 14, 16, 18 is zero or greater, then the amount is sufficient.

After either the user chooses not to verify stock availability 230 or after the user completes verifying stock availability 230, touch screen 90 prompts the user to enter a quantity 240 of paint to be made. The user then selects the quantity 240. In a preferred embodiment, the user may select either 1 gallon for a 1 gallon paint bucket 20, or 5 gallons for a 5 gallon paint bucket 20. The user is then prompted to position the container 242 and to respond affirmatively that the container or receiving reservoir 20 has been positioned. The attributes for the paint composition selected by the user are then displayed and the user is prompted to select start. Apparatus 10 then proceeds to automatically fill 244 receiving reservoir 20 with the appropriate amounts of each aqueous composition to make the desired amount of the desired paint composition recipe.

Apparatus 10 will not proceed to supply compositions to receiving reservoir 20 unless position indicator 94 is depressed by receiving reservoir 20, indicating that receiving reservoir 20 is properly positioned. If position indicator 94 is not depressed, then it will be in an open position and will not allow motors 40, 42, 44, 46 to receive power. Also, if during the filling process, the position indicator is not depressed, then motors 40, 42, 44, 46 will not receive power and apparatus 10 will cease supplying compositions to receiving reservoir 20. This is done to assure that a receiving reservoir 20 is properly positioned to receive the compositions. Likewise, if emergency stop switch 92 is depressed, then it will be in an open position and will not allow the circuits for motors 40, 42, 44, 46 to be completed.

Referring now to FIG. 1, in filling receiving reservoir 20, control 80 first calibrates scale 70 to read zero with the receiving reservoir 20 seated on scale 70. Then, if the first composition is needed for the recipe, control 80 emits a signal to first solenoid 60 to open first valve 50 and a signal to first motor 40 to turn on, thereby powering first pump 30. First pump 30 pumps a first aqueous composition from first reservoir 12 through first valve 50 and into receiving reservoir 20. While receiving reservoir 20 is being filled, scale 70 is emitting a flow amount signal to control 80 indicating the flow amount or weight of the first aqueous composition that has been supplied to receiving reservoir 20. Once the predetermined amount of the first composition has been supplied to receiving reservoir 20, control 80 emits a signal to first solenoid 60 to close first valve 50 and a signal to first motor 40 to turn off. Control 80 preferably sends signals to first solenoid 60 and first motor 40 when scale 70 indicates that the amount of the first composition in receiving reservoir 20 is the desired amount of the first composition for the recipe minus an offset amount. The offset amount represents the amount of additional first composition that will be supplied to receiving reservoir 20 even after control 80 has sent the signals to first solenoid 60 and first motor 40.

After supply of the first composition is completed, scale 70 is again calibrated to zero. Typically there will be a delay of two to three seconds after supply of the first composition is completed to allow scale 70 to be properly calibrated. Then, if the second composition is needed for the recipe, control 80 emits a signal to second solenoid 62 to open second valve 52 and a signal to second motor 42 to turn on, thereby powering second pump 32. Second pump 32 pumps the second aqueous composition from second reservoir 14 through second valve 52 and into receiving reservoir 20. While receiving reservoir 20 is being filled, scale 70 is emitting a flow amount signal to control 80 indicating the flow amount or weight of the second aqueous composition that has been supplied to receiving reservoir 20. Once the predetermined amount of the second composition has been supplied to receiving reservoir 20, control 80 emits a signal to second solenoid 62 to close second valve 52 and a signal to second motor 42 to turn off. Control 80 preferably sends the signals to second solenoid 62 and second motor 42 when scale 70 indicates that the amount of the second composition in receiving reservoir 20 is the desired amount of the second composition for the recipe minus an offset amount. As described above, the offset amount represents the amount of additional second composition that will be supplied to receiving reservoir 20 even after control 80 has sent the signals to second solenoid 62 and second motor 42 to turn off.

After supply of the second composition is completed, scale 70 is again calibrated to zero. Again, there is generally a delay of two to three seconds after supply of the second composition is completed to allow scale 70 to be properly calibrated. Then, if the third composition is needed for the recipe, control 80 emits a signal to third solenoid 64 to open third valve 54 and a signal to third motor 44 to turn on, thereby powering third pump 34. Third pump 34 pumps the third aqueous composition from third reservoir 16 through third valve 54 and into receiving reservoir 20. While receiving reservoir 20 is being filled, scale 70 is emitting a flow amount signal to control 80 indicating the flow amount or weight of the third aqueous composition that has been supplied to receiving reservoir 20. Once the predetermined amount of the third composition has been supplied to receiving reservoir 20, control 80 emits a signal to third solenoid 64 to close third valve 54 and a signal to third motor 44 to turn off. Control 80 preferably sends the signals to third solenoid 64 and third motor 44 when scale 70 indicates that the amount of the third composition in receiving reservoir 20 is the desired amount of the third composition for the recipe minus an offset amount. As described above, the offset amount represents the amount of additional third composition that will be supplied to receiving reservoir 20 even after control 80 has sent the signals to third solenoid 64 and third motor 44 to turn off.

After supply of the third composition is completed, scale 70 is again calibrated to zero. Again, there is generally a delay of two to three seconds after supply of the third composition is completed to allow scale 70 to be properly calibrated. Then, if the fourth composition is needed for the recipe, control 80 emits a signal to fourth solenoid 66 to open fourth valve 56 and a signal to fourth motor 46 to turn on, thereby powering fourth pump 36. Fourth pump 36 pumps the fourth aqueous composition from fourth reservoir 18 through fourth valve 56 and into receiving reservoir 20. While receiving reservoir 20 is being filled, scale 70 is emitting a flow amount signal to control 80 indicating the flow amount or weight of the fourth aqueous composition that has been supplied to receiving reservoir 20. Once the predetermined amount of the fourth composition has been supplied to receiving reservoir 20, control 80 emits a signal to fourth solenoid 66 to close fourth valve 56 and a signal to fourth motor 46 to turn off. Control 80 preferably sends the signals to fourth solenoid 66 and fourth motor 46 when scale 70 indicates that the amount of the fourth composition in receiving reservoir 20 is the desired amount of the fourth composition for the recipe minus an offset amount. As described above, the offset amount represents the amount of additional fourth composition that will be supplied to receiving reservoir 20 even after control 80 has sent the signals to fourth solenoid 66 and fourth motor 46 to turn off.

Figure 4:
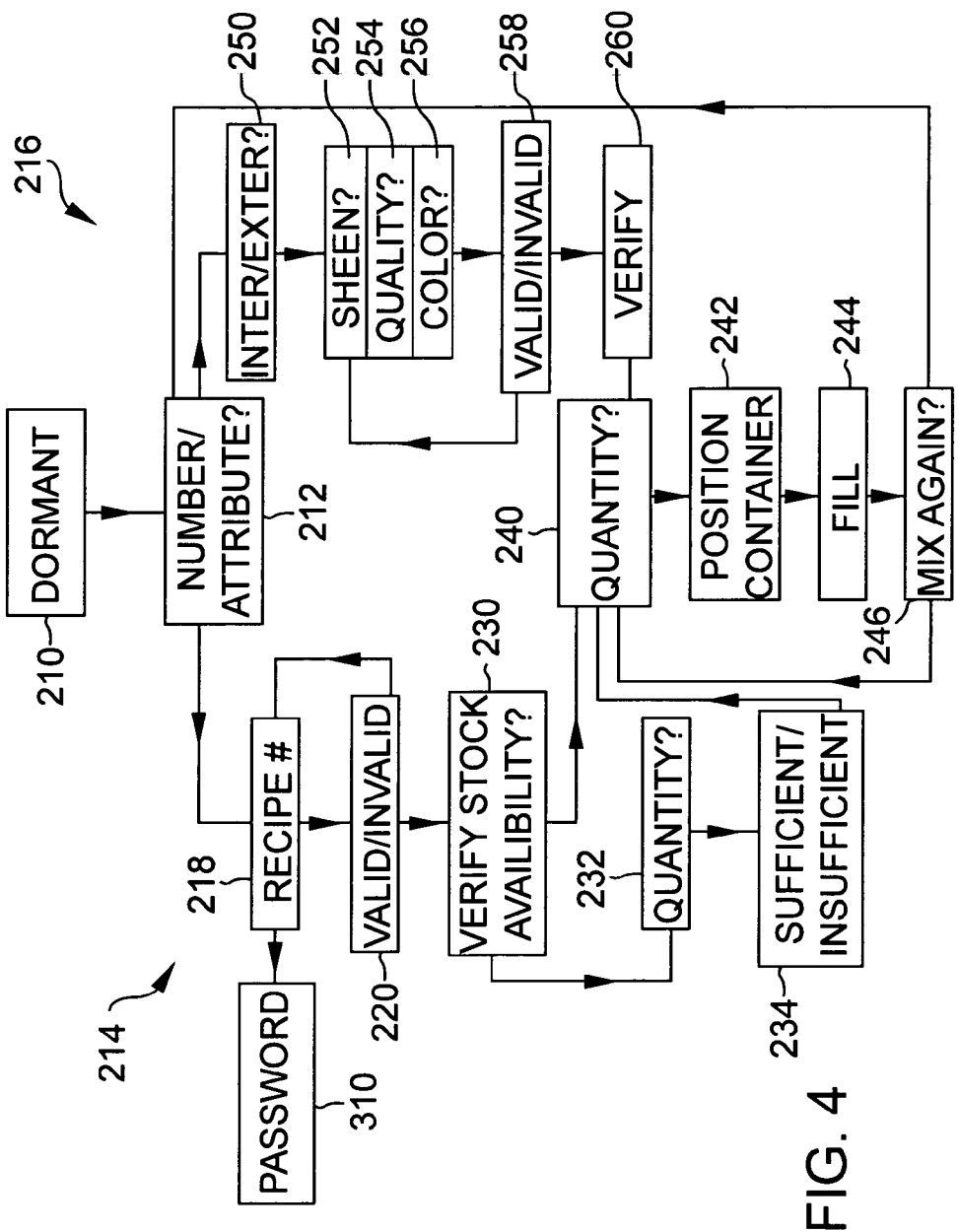
FIG. 4 is a flowchart depicting a method of producing a paint composition according to the present invention.

Referring now to FIG. 4, the user will then be prompted to choose whether to mix again 246. If the user chooses to mix again 246, the user will be returned to the quantity prompt 240. In this way, if the user wants to mix the same recipe, the user will not be required to go through the entire selection process again. If the user chooses not to mix again, then the user is returned to number or attribute prompt 212.

Referring back to the number or attribute prompt 212, if the user chooses to select the paint composition by attribute 216, the user will be prompted to make a series of selections regarding the attributes or characteristics of the desired paint composition. An interior or exterior prompt 250 prompts the user to choose whether the paint will be used for an interior use or for an exterior use. A sheen prompt 252 prompts the user to select a sheen for the paint composition. If the user chooses interior use at prompt 250, then the choices at sheen prompt 252 preferably include flat, low sheen, egg shell, semi-gloss, and high gloss. A quality prompt 254 prompts the user to select a quality for the paint composition. Preferably, the choices at quality prompt 254 include retail, professional, and economy, with retail being the highest quality, professional being intermediate quality, and economy being low quality. A color prompt 256 prompts the user to select a color base for the paint. Preferably, the choices at color prompt 256 include white, pastel, tinting, deep tone, and neutral. In a preferred embodiment, sheen prompt 252, quality prompt 254, and color prompt 256 are all displayed simultaneously on touch screen 90. Those skilled in the art will appreciate that the choices for sheen, quality, and color may include choices different than those described herein. Also, other prompts, such as a prompt for paint coverage attributes, may be included.

After the attributes have been selected, control 80 correlates the desired attributes with a recipe number that will produce those attributes. The recipe number is then displayed and a valid or invalid display 258 displays whether the selected attributes have yielded a recipe number is either valid or invalid. If the recipe number is invalid, the user may enter different attributes. If the recipe number is valid then a verify prompt 260 prompts the user to verify that the selected attributes are actually those desired by the user. If the user touches an appropriate area of the screen to verify the attribute choices, then quantity prompt 240 prompts the user to enter a quantity of paint to be filled. The remainder of the filling process is identical to that described above.

After supply of the fourth composition is completed, receiving reservoir 20 may be removed. Then color additives may be added to the resulting aqueous paint composition. The adding of color additives to a base aqueous paint composition and the colors to be added are well known in the art. After the color additives, if any, are added the resulting composition is then preferably mixed by a shaker machine to produce the desired paint. The paint is preferably then sold to a consumer, but it may be sold to a paint supplier, who will in turn sell it to a consumer.

Figure 5:
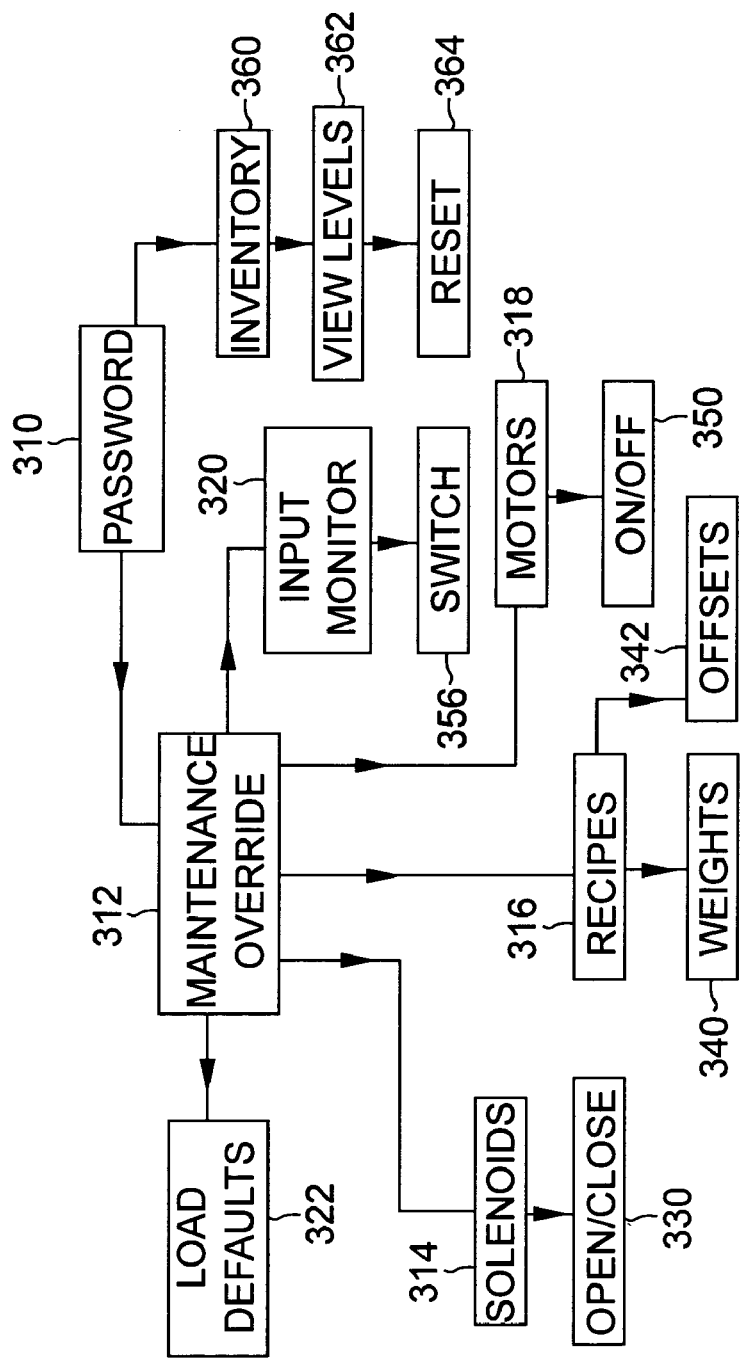
FIG. 5 is a flowchart depicting a method of maintaining an apparatus according to the present invention.

In a preferred embodiment, a number is selected as a password entry number, a number is selected as a maintenance override password, and a number is selected as an inventory password. If the password entry number is entered by the user at recipe number prompt 218, then password prompt 310 prompts the user to enter a password. Referring now to FIGS. 1 and 5, if the user enters the maintenance override password at the password prompt 310, then a maintenance override prompt 312 prompts the user to select either solenoid control 314, recipe control 316, motor control 318, input monitor 320, or load defaults 322.

If the user selects solenoid control 314, then an open/close prompt 330 for each of the four solenoids 60, 62, 64, 66 allows the user to actuate each of the four solenoids independently to close or open valves 50, 52, 54, 56. Solenoid control 314 is useful for troubleshooting when problems arise that might involve solenoids 60, 62, 64, 66 or valves 50, 52, 54, 56.

If the user selects recipe control 316, then the user is prompted to enter a recipe number. Upon entering a recipe number, a weight prompt 340 corresponding to each of the four aqueous compositions prompts the user to enter or adjust the weight of that composition for the recipe number entered. An offset prompt 342 corresponding to each of the four compositions allows the user to adjust the offset amounts discussed above. Preferably, the offset amounts are adjusted after testing to assure that the offset amount represents the amount of additional composition that will be supplied to receiving reservoir 20 even after control 80 has sent a close signal to a solenoid 60, 62, 64, or 66 and an off signal to motor 40, 42, 44, or 46 (see FIGS. 1-3) to stop the flow of the composition.

If the user selects motor control 318, then an on/off prompt 350 for each of the four motors 40, 42, 44, 46 allows the user to independently turn each of the four motors 40, 42, 44, 46 on or off. Motor control 318 is useful for troubleshooting when problems arise that might involve motors 40, 42, 44, 46 or pumps 30, 32, 34, 36.

If the user selects input monitor 320, a switch indicator 356 allows the user to monitor the status of emergency stop switch 92 and position indicator 94 (see FIGS. 1-3). Input monitor 320 is useful for troubleshooting problems that might involve switch 92 or position indicator 94 (see FIGS. 1-3).

If the user selects load defaults 322, then all of the default values for recipes, offsets, etc. will be reset to their original default values.

Referring back to password prompt 310, if the inventory password is entered at the password prompt then an inventory monitor 360 includes a view levels display 362 that displays current composition levels for each of the supply reservoirs 12, 14, 16, 18 calculated by control 80 as described above (see FIGS. 1-4). Also, a reset prompt 364 corresponding to each supply reservoir 12, 14, 16, 18 allows the current level for each supply reservoir 12, 14, 16, 18 to be reset so that it shows the supply reservoir being full. This should be done when one of the supply reservoirs 12, 14, 16, 18 is refilled.

As discussed above, control 80 is preferably a computer system such as a the programmable logic control system described herein. Control 80 is preferably programmed with a control program that causes control 80 to perform the various control and selection functions described above. The control program may be a program product in a variety of forms, and the present invention applies equally regardless of the particular type of signal bearing media to actually carry out the distribution of the program. Examples of signal bearing media include recordable type media such as floppy disks and CD ROMS, and transmission type media such as digital and analog communication links, including wireless communication links. The program product tangibly embodies a program of machine-readable instructions executable by a computer system having an operating system. The program product, in combination with a computer system, directs the computer system, such as the PLC described herein, to perform the embodiments of the current invention. As such, the control program can access Application Programmer Interfaces (APIs), if available, or contain programming that allows the control program to provide prompts to the user, distribute on/off signals to the motors, distribute open/close signals to the solenoids, correlate recipe numbers with associated paint attributes and composition weights, etc. Essentially, the control program will contain programming to allow it to perform any of the functionality associated with FIGS. 1-5 and associated text.

The present invention provides the advantage of allowing a paint distributor or paint store to produce a wide variety of water-based paints with only four aqueous compositions. The four aqueous compositions may be stored and the aqueous paint composition may be produced in the same location (i.e., the same building or complex of buildings) as the sale to an end paint consumer. This is made possible because each of the four aqueous compositions may be stored for long periods of time without significant settling. Accordingly, the present invention alleviates the current requirement for paint distributors or stores to maintain large inventories of a wide variety of paint types and to guess about the types of paints that consumers might demand.

While the invention has been particularly shown and described with reference to preferred embodiments thereof, it will be understood by those skilled in the art that various changes in form and details may be made therein without departing from the spirit and scope of the invention.

The invention claimed is:

1. A plurality of varied, but stable premixed aqueous compositions, sufficient to form a variety of paint compositions, which plurality comprises:
   (i) at least one premixed pigment composition comprising a pigment;
   (ii) at least one premixed low resin composition comprising at least one of calcined clay, diatomaceous earth, ground limestone, and mixtures thereof; and
   (iii) at least one premixed binder composition comprising a resinous binder.

2. The plurality of premixed compositions of claim 1, wherein the number of premixed compositions is 3 or more.

3. The plurality of premixed compositions of claim 1, wherein at least one of the premixed compositions has a PVC of about 35% to about 100%.

4. A plurality of paint products produced by a process which comprises the steps of:
   (a) providing a plurality of varied, but stable premixed aqueous compositions which plurality comprises;
      (i) at least one premixed pigment composition comprising a pigment;
      (ii) at least one premixed low resin composition comprising at least one of calcined clay, diatomaceous earth ground limestone, and mixtures thereof;
      (iii) at least one premixed binder composition comprising a resinous binder; and (b) dispensing a predetermined amount of each of the premixed compositions into containers to form a paint product of the plurality of paint products.

5. A plurality of different but stable premixed aqueous compositions sufficient to formulate a plurality of paint products useful for forming pigmented coatings, which plurality of premixed compositions comprises:
   (i) at least one premixed composition having a pigment;
   (ii) at least two premixed compositions each of which comprises at least one resin containing binder.

6. A method of forming a plurality of paint products, which method comprises the steps of:
   (a) providing a plurality of the premixed compositions of claim 5; and
   (b) dispensing a predetermined amount of each of the premixed compositions into containers to form the plurality of paint products.

7. A method of forming a plurality of paint products comprising the steps of:
   (a) providing a plurality of varied, but stable premixed aqueous compositions comprising:
      (i) at least one premixed pigment composition comprising a pigment;
      (ii) at least one premixed low resin composition, comprising at least one of calcined clay, diatomaceous earth, ground limestone, and mixtures thereof;
      (iii) at least one premixed binder composition comprising a resin containing binder; and
   (b) dispensing a predetermined amount of each of the premixed compositions into containers to form the plurality of paint products.

8. The method of claim 7, further comprising the step of mixing the premixed compositions before, while, or after they are dispensed into the containers.

9. The method of claim 7, further comprising the step of mixing the premixed compositions before or while they are dispensed into the containers.

10. The method of claim 7, further comprising the step of adjusting the viscosity of the premixed compositions before, while, or after they are dispensed into the containers.

11. The method of claim 7, further comprising the step of adjusting the viscosity of the premixed compositions before or while they are dispensed into the containers.

12. The method of claim 7, further comprising the step of adding at least one additive that enhances application or final performance of the paint products.

13. The method of claim 12, wherein the additive is a thickener.

14. The method of claim 7, further comprising the step of adding at least one colorant to the premixed compositions.

15. The method of claim 7, wherein the method is carried out at a paint manufacturing facility.

16. The method of claim 7, wherein the number of premixed compositions is 4 or more.

17. The method of forming a plurality of paint products of claim 7, wherein at least one of the premixed compositions has a PVC of about 35% to about 100%.

18. The method of claim 7, wherein the method is carried out at the point-of-sale.

19. The method of claim 7, wherein the method is carried out at the point-of-use.

20. The method of claim 7, wherein the method is controlled by programmed dispensing.

21. A method of forming a range of paint products, the range comprising variations in the plurality of the paint products:
   (a) providing a plurality of varied, but stable premixed aqueous compositions sufficient to formulate the plurality of varied paint products, which plurality of premixed aqueous compositions comprises:
      (i) at least one premixed pigment composition comprising a pigment;
      (ii) at least one premixed low resin composition comprising at least one of calcined clay, diatomaceous earth, ground limestone, and mixtures thereof;
      (iii) at least one premixed binder composition comprising a resin containing binder; and
      (iv) at least one additional, different premixed pigment, low resin, or high resin composition selected from the group consisting of (i), (ii), and (iii) and mixtures thereof; and
   (b) dispensing a predetermined amount of each of the premixed compositions into containers to form the plurality of paint products.

22. The method of claim 21, further comprising the step of mixing the premixed compositions before, while, or after they are dispensed into the containers.

23. The method of claim 21, further comprising the step of mixing the premixed compositions before or while they are dispensed into the containers.

24. The method of claim 21, further comprising the step of adjusting the viscosity of the premixed compositions before, while, or after they are dispensed into the containers.

25. The method of claim 21, further comprising the step of adjusting the viscosity of the premixed compositions before or while they are dispensed into the containers.

26. The method of claim 21, further comprising the step of adding at least one additive that enhances application or final performance of the paint products.

27. The method of claim 26, wherein the additive is a thickener.

28. The method of claim 21, further comprising the step of adding at least one colorant to the premixed compositions.

29. The method of claim 21, wherein the method is carried out at a paint manufacturing facility.

30. The method of claim 21, wherein the number of premixed compositions is 4 or more.

31. The method of forming a plurality of paint products of claim 21, wherein at least one of the premixed compositions has a PVC of about 35% to about 100%.

32. The method of claim 21, wherein the method is carried out at the point-of-sale.

33. The method of claim 21, wherein the method is carried out at the point-of-use.

34. The method of claim 21, wherein the method is controlled by programmed dispensing.

35. A premixed aqueous low resin composition, useful for producing a pigmented paint product containing other paint contents, which premixed low resin composition consists essentially of:
   (i) at least one of calcined clay, ground limestone, and diatomaceous earth, the premixed low resin composition having a Stormer viscosity of about 50 to about 250 KU;
   (ii) at least one thickener,
   (iii) water, and
   (iv) an optional resin containing binder; wherein the premixed low resin composition contents are stable when combined with each other and with the contents of the paint product.

36. A plurality of premixed aqueous compositions for forming an aqueous paint composition, the plurality of compositions comprising:
- a premixed pigment composition comprising a pigment;
- a premixed low resin composition comprising at least one of calcined clay, ground limestone, diatomaceous earth, and mixtures thereof and
- a premixed binder composition comprising a resin;
- wherein mixing a portion of the pigment composition with a portion of at least one of the low resin composition and the binder composition produces the aqueous paint composition from the premixed compositions.

37. The plurality of premixed aqueous compositions of claim 36, wherein the number of premixed compositions is 3 or more.

38. The plurality of premixed aqueous compositions of claim 36, wherein the premixed low resin composition has a PVC of about 35% to about 100%.

39. A plurality of paint products made by a method comprising:
- providing a plurality of varied, but stable premixed aqueous compositions, which plurality comprises:
- a premixed pigment composition comprising a pigment;
- a premixed low resin composition comprising at least one of calcined clay, ground limestone, diatomaceous earth, and mixtures thereof;
- a premixed binder composition comprising a resin; and
- mixing a portion of the pigment composition with a portion of at least one of the low resin composition and the binder composition to produce the plurality of paint products from the premixed compositions.

40. A plurality of varied, but stable, premixed aqueous compositions for formulating a plurality of paint products, the plurality of premixed aqueous paint compositions comprising:
- a premixed pigment composition comprising a pigment;
- at least two premixed compositions each of which comprises a resin.

41. A method of forming a plurality of paint products, which method comprises the steps of:
- (a) providing a plurality of the premixed compositions of claim 40; and
- (b) dispensing a portion of the premixed pigment composition and a portion of at least one of each of the at least two premixed compositions each having the resin into containers to form the plurality of paint products.

42. A method of producing a plurality of paint products, the method comprising:
- premixing a pigment composition comprising a pigment;
- premixing a low resin composition comprising at least one of calcined clay, diatomaceous earth, ground limestone, and mixtures thereof;
- premixing a binder composition comprising a resin; and
- mixing a portion of the pigment composition with a portion of at least one of the low resin composition and the binder composition in a container to produce an aqueous paint product of the plurality of paint products from the premixed compositions.

43. The method of claim 42, further comprising the step of mixing the premixed compositions before, while, or after they are dispensed into the containers.

44. The method of claim 42, further comprising the step of mixing the premixed compositions before or while they are dispensed into the containers.

45. The method of claim 42, further comprising the step of adjusting the viscosity of the premixed compositions before, while, or after they are dispensed into the containers.

46. The method of claim 42, further comprising the step of adjusting the viscosity of the premixed compositions before or while they are dispensed into the containers.

47. The method of claim 42, further comprising the step of adding at least one additive that enhances application or final performance of the aqueous paint product.

48. The method of claim 47, wherein the additive is a thickener.

49. The method of claim 42, further comprising the step of adding at least one colorant to the premixed compositions.

50. The method of claim 42, wherein the method is carried out at a paint manufacturing facility.

51. The method of claim 42, wherein the number of premixed compositions is 4 or more.

52. The method of claim 42, wherein the low resin composition has a PVC of about 35% to about 100%.

53. The method of claim 42, wherein the method is carried out at the point-of-sale.

54. The method of claim 42, wherein the method is carried out at the point-of-use.

55. The method of claim 42, wherein the method is controlled in accordance with programmed dispensing.

56. A method of producing a plurality of paint products and variations of the plurality of paint products, the method comprising:
- (a) providing a plurality of varied, but stable premixed aqueous compositions for producing the plurality of paint products and the variations of the plurality of paint products, which plurality of premixed aqueous compositions comprises:
  - (i) a premixed pigment composition comprising a pigment;
  - (ii) a premixed low resin composition comprising at least one of calcined clay, diatomaceous earth, ground limestone, and mixtures thereof;
  - (iii) a premixed binder composition comprising a resin; and
  - (iv) an additional different premixed composition from the group consisting of the compositions of (i), (ii), and (iii), and mixtures thereof and
- (b) mixing a portion of the pigment composition with a portion of at least one of the low resin composition, the binder composition, and the additional different composition in a container to produce the variations of the plurality of paint products.

57. A plurality of varied, but stable premixed aqueous compositions useful for formulating a paint product, which plurality comprises:
- (a) a premixed aqueous pigment composition for forming a paint product, the premixed composition comprising:
  - a pigment:
  - a dispersant:
  - a thickener: and
  - water:
  - wherein the dispersant and the thickener are stable when mixed with the pigment and with other paint contents and
- (b) a premixed binder composition, which binder composition consists essentially of a water-borne resin and water;
- wherein the contents of the premixed compositions are stable when mixed with each other and with the contents of the other premixed compositions of the plurality.

58. The plurality of premixed aqueous compositions of claim 57, wherein the premixed binder composition further consists essentially of at least one additive comprising a coalescent, the additive being present in an amount of about 2% by weight, based on the total weight of the premixed binder composition.

59. A plurality of varied, but stable, premixed compositions, useful for formulating a paint product, which plurality comprises:
   (a) the plurality of premixed aqueous compositions of claim 57; and
   (b) a premixed aqueous low resin composition, at least one of the which consists essentially of:
      (i) at least one of calcined clay, ground limestone, diatomaceous earth, and mixtures thereof,
      (ii) at least one thickener,
      (iii) water, and
      (iv) optionally a resin.

60. The plurality of premixed compositions of claim 57, wherein the premixed binder composition further consists essentially of at least one additive comprising a coalescent, with the additive being present in an amount of less than about 20% by weight, based on the total weight of the binder composition.

61. The premixed pigment composition of claim 57, wherein the pigment comprises titanium dioxide.

* * * * *